United States Patent
Armano et al.

(10) Patent No.: US 12,098,803 B2
(45) Date of Patent: Sep. 24, 2024

(54) FRAME ENHANCER

(71) Applicant: PanelClaw, Inc., North Andover, MA (US)

(72) Inventors: Joseph Armano, Andover, MA (US); Hanghai Yang, Andover, MA (US); Colby Anderson Andresen, Lowell, MA (US)

(73) Assignee: PanelClaw, Inc., North Andover, MA (US)

( * ) Notice: Subject to any disclaimer, the term of this patent is extended or adjusted under 35 U.S.C. 154(b) by 25 days.

(21) Appl. No.: 18/112,794

(22) Filed: Feb. 22, 2023

(65) Prior Publication Data

US 2024/0280214 A1  Aug. 22, 2024

(51) Int. Cl.
| | |
|---|---|
| *F16M 13/02* | (2006.01) |
| *H02S 30/10* | (2014.01) |
| *F24S 25/63* | (2018.01) |
| *F24S 25/632* | (2018.01) |
| *F24S 25/634* | (2018.01) |
| *F24S 25/65* | (2018.01) |
| *F24S 25/67* | (2018.01) |

(52) U.S. Cl.
CPC ............. *F16M 13/02* (2013.01); *H02S 30/10* (2014.12); *F24S 25/63* (2018.05); *F24S 25/632* (2018.05); *F24S 25/634* (2018.05); *F24S 25/65* (2018.05); *F24S 25/67* (2018.05)

(58) Field of Classification Search
CPC ........ F16M 13/02; H02S 30/10; F24S 25/634; F24S 25/65; F24S 25/67; F24S 25/63; F24S 25/632; F24S 2025/6003; F24S 2025/6004

See application file for complete search history.

(56) References Cited

U.S. PATENT DOCUMENTS

| | | | | |
|---|---|---|---|---|
| 4,669,808 A | * | 6/1987 | Owen | H01R 13/113 439/858 |
| 6,106,310 A | * | 8/2000 | Davis | H01R 4/48 439/95 |
| 7,435,134 B2 | * | 10/2008 | Lenox | F24S 25/20 52/173.3 |
| 8,713,881 B2 | | 5/2014 | DuPont et al. | |

(Continued)

FOREIGN PATENT DOCUMENTS

| | | |
|---|---|---|
| CA | 2857957 A1 | 6/2013 |
| CA | 3013344 A1 | 2/2019 |

(Continued)

*Primary Examiner* — Eret C McNichols
(74) *Attorney, Agent, or Firm* — The Webb Law Firm

(57) ABSTRACT

A frame enhancer may include a body, a first extension extending from the body and including a first notch, a second extension extending from the body, and a third extension extending from the body and including a second notch. The first extension and the second extension may define a first slot. The second extension and the third extension define a second slot. The first slot may be configured to receive a first side of a support arm, and the second slot may be configured to receive a second side of the support arm. The first notch may be configured to lock the first side of the support arm in the first slot, and the second notch may be configured to lock the second side of the support arm in the second slot. At least a portion of the first and third extensions may be configured to support a flange.

20 Claims, 8 Drawing Sheets

(56) References Cited

U.S. PATENT DOCUMENTS

| | | | |
|---|---|---|---|
| 8,974,245 B2* | 3/2015 | Kovalov | H01R 27/02 |
| | | | 439/100 |
| 9,057,542 B2 | 6/2015 | Schuit et al. | |
| 9,145,906 B2* | 9/2015 | Schuit | F16B 7/0446 |
| 9,312,411 B2 | 4/2016 | Laurin et al. | |
| 9,331,629 B2* | 5/2016 | Cheung | F24S 25/634 |
| 9,397,605 B2 | 7/2016 | Stapleton | |
| 9,450,130 B2* | 9/2016 | Grushkowitz | H01L 31/05 |
| 10,090,800 B2* | 10/2018 | McPheeters | F16B 2/185 |
| 10,240,820 B2* | 3/2019 | Ash | F24S 25/636 |
| 10,587,220 B2* | 3/2020 | De Vogel | H02S 20/20 |
| D880,285 S * | 4/2020 | Olenick | D8/399 |
| 10,622,935 B1* | 4/2020 | Liu | H02S 30/00 |
| 10,801,538 B2* | 10/2020 | Legall | F24S 25/634 |
| 11,296,648 B1* | 4/2022 | Jasmin | H02S 30/10 |
| 11,431,288 B2* | 8/2022 | Gorny | H02S 30/00 |
| 2010/0132766 A1* | 6/2010 | Jenkins | H01L 31/048 |
| | | | 136/251 |
| 2013/0102165 A1 | 4/2013 | DuPont | |
| 2014/0202525 A1* | 7/2014 | Janssens | F16M 13/02 |
| | | | 248/575 |
| 2015/0034362 A1* | 2/2015 | Kovalov | H01R 4/646 |
| | | | 174/126.1 |
| 2016/0282018 A1* | 9/2016 | Ash | F24S 25/636 |
| 2021/0194410 A1* | 6/2021 | Yang | H02S 20/23 |
| 2023/0402958 A1* | 12/2023 | Jasmin | H02S 20/23 |

FOREIGN PATENT DOCUMENTS

| | | | | |
|---|---|---|---|---|
| EP | 2458303 A1 * | 5/2012 | | B60C 1/00 |
| TW | 201107611 A1 | 3/2011 | | |

* cited by examiner

FRAME ENHANCER

BACKGROUND OF THE INVENTION

Field of the Invention

This disclosure relates generally to a frame enhancer and, more particularly, to a frame enhancer for application to a tilt arm and/or support used in a solar panel system.

Description of Related Art

Solar panels and solar panel arrays must be built to withstand various environmental conditions. Weather, such as snowfall, and environmental factors, such as leaves, can accumulate on the solar panels. This accumulation can add weight to the solar panel and its support structure. Regions that experience especially high wind speeds also experience especially high uplift on the solar panels and their support structure. These higher loads can require specific reinforcement of portions of the solar panel array such as the connections to the roof, building or earth, the racking and support structure, the connection of the solar panels to the support structure and racking, and the solar panels to prevent failure. Failure can result in the loss of power coming from the array and potentially personal and/or property damage. Thus, there is a need to provide reinforcement to solar panel arrays and the underlying support structure of the solar panel in order to prevent structural failure.

SUMMARY OF THE INVENTION

One non-limiting embodiment of the present disclosure may be a frame enhancer. The frame enhancer may include a body, a first extension extending from the body and including a first notch, a second extension extending from the body, and a third extension extending from the body and including a second notch. The first extension and the second extension may define a first slot. The second extension and the third extension define a second slot. The first slot may be configured to receive a first side of a support arm therein, and the second slot may be configured to receive the second side of the support arm therein. The first notch may be configured to lock the first side of the support arm in the first slot, and the second notch may be configured to lock the second side of the support arm in the second slot. At least a portion of the first extension, the second extension, and the third extension may be configured to support a flange connected to the support arm.

The first extension may include a first leg and a second leg, defining a first channel therebetween. The third extension may include a first leg and a second leg defining a second channel therebetween. The first channel and the second channel may be configured to receive a flange therein. The second leg of the first extension may extend farther than the first leg of the first extension. The second leg of the third extension may extend farther than the first leg of the third extension. The second leg of the first extension and the second leg of the third extension may support the flange. Upon locking the first side of the support arm in the first slot and locking the second side of the support arm in the second slot, the frame enhancer may be slidably mounted to the support arm.

The first notch may protrude from a portion of the first extension adjacent to the first channel, and the second notch may protrude from a portion of the third extension adjacent to the second channel. The second extension may include a first leg and a second leg defining a third channel therebetween. The third channel may be configured to receive a portion of the flange therein. The portion of the flange received within the third channel may be located between the first and second sides of the support arm. The frame enhancer may be electrically bonded to the support arm. The first extension and the third extension may extend from the base a first length, and the second extension may extend from the base a second length, and the first length is longer than the second length.

In another non-limiting embodiment or aspect of the present disclosure, a frame enhancer may include a body having a first extension, a second extension, and a third extension. The first extension and the second extension may define a first slot configured to receive a portion of a support arm therein. The second extension and the third extension may define a second slot configured to receive a portion of the support arm therein. The first extension may define a first channel configured to receive a portion of the flange therein. The second extension may define a second channel. The third extension may define a third channel configured to receive a portion of the flange therein. The frame enhancer may be configured to be mounted to the support arm and the flange. At least a portion of the first extension and the third extension are configured to support the flange.

The frame enhancer may further include a first notch extending into the first slot and a second notch extending into the second slot, and the first notch may be configured to lock the support arm in the first slot, and the second notch may be configured to lock the support arm in the second slot. The first notch may extend from the first extension, and the second notch may extend from the third extension. The first extension and the third extension may extend a distance longer than the second extension. The first extension may include a first leg and a second leg defining the first channel therebetween. The second extension may include a first leg and a second leg defining a second channel therebetween. The third extension may include a first leg and a second leg defining the third channel therebetween. The second legs of the first extension, second extension, and third extension may extend beyond their respective first legs, and the second legs of the first extension, second extension, and third extension may support the flange.

In another non-limiting embodiment or aspect of the present disclosure, an assembly for enhancing a frame to support a bracket may include a tilt arm; a bracket extending from and supported by the tilt arm; and a frame enhancer, which may include a body having a first extension, a second extension, and a third extension. The first extension and the second extension may define a first slot configured to receive a portion of the tilt arm therein. The second extension and the third extension may define a second slot configured to receive a portion of the tilt arm therein. The first extension may define a first channel configured to receive a portion of the bracket therein. The second extension may define a second channel. The third extension may define a third channel configured to receive a portion of the bracket therein. The frame enhancer may be configured to be mounted to the tilt arm and the bracket, and at least a portion of the first extension and the third extension may be configured to support the bracket.

The assembly may further include a first notch extending into the first slot and a second notch extending into the second slot, and the first notch may be configured to lock the portion of the tilt arm in the first slot, and the second notch may be configured to lock the portion of the tilt arm in the second slot. The first extension may include a first leg and a second leg defining the first channel therebetween, and the third extension may include a first leg and a second leg defining the third channel therebetween. The frame enhancer may be configured to be slidably mount to the tilt arm and the bracket.

In some embodiments or aspects, the present disclosure may be characterized by one or more of the following numbered clauses:

Clause 1. A frame enhancer comprising: a body; a first extension extending from the body, the first extension comprising a first notch; a second extension extending from the body; and a third extension extending from the body, the third extension comprising a second notch, wherein the first extension and the second extension define a first slot, wherein the second extension and the third extension define a second slot, wherein the first slot is configured to receive a first side of a support arm therein, and the second slot is configured to receive a second side of the support arm therein, wherein the first notch is configured to lock the first side of the support arm within the first slot, and the second notch is configured to lock the second side of the support arm within the second slot, and wherein at least a portion of the first extension, the second extension, and the third extension are configured to support a flange connected to the support arm.

Clause 2. The frame enhancer of clause 1, wherein the first extension comprises a first leg and a second leg defining a first channel therebetween, wherein the third extension comprises a first leg and a second leg defining a second channel therebetween, and wherein the first channel and the second channel are configured to receive the flange therein.

Clause 3. The frame enhancer of clause 1 or 2, wherein the second leg of the first extension extends farther than the first leg of the first extension, and wherein the second leg of the third extension extends farther than the first leg of the third extension.

Clause 4. The frame enhancer of any of clauses 1-3, wherein the second leg of the first extension and the second leg of the third extension support the flange.

Clause 5. The frame enhancer of any of clauses 1-4, wherein, upon locking the first side of the support arm in the first slot and locking the second side of the support arm in the second slot, the frame enhancer is slidably mounted to the support arm.

Clause 6. The frame enhancer of any of clauses 1-5, wherein the first notch protrudes from a portion of the first extension adjacent to the first channel, and the second notch protrudes from a portion of the third extension adjacent to the second channel.

Clause 7. The frame enhancer of any of clauses 1-6, wherein the second extension comprises a first leg and a second leg defining a third channel therebetween, and wherein the third channel is configured to receive a portion of the flange therein.

Clause 8. The frame enhancer of any of clauses 1-7, wherein the portion of the flange received within the third channel is located between the first and second sides of the support arm.

Clause 9. The frame enhancer of any of clauses 1-8, wherein the frame enhancer is electrically bonded to the support arm.

Clause 10. The frame enhancer of any of clauses 1-9, wherein the first extension and the third extension extend from the base a first length, and the second extension extends from the base a second length, and wherein the first length is longer than the second length.

Clause 11. A frame enhancer comprising: a body comprising: a first extension; a second extension; and a third extension, wherein the first extension and the second extension define a first slot configured to receive a portion of a support arm therein, wherein the second extension and the third extension define a second slot configured to receive a portion of the support arm therein, wherein the first extension defines a first channel configured to receive a portion of a flange therein, wherein the second extension defines a second channel, wherein the third extension defines a third channel configured to receive a portion of the flange therein, wherein the frame enhancer is configured to be mounted to the support arm and the flange, and wherein at least a portion of the first extension, the second extension, and the third extension are configured to support the flange.

Clause 12. The frame enhancer of clause 11, wherein the frame enhancer further comprises a first notch extending into the first slot and a second notch extending into the second slot, and wherein the first notch is configured to lock the support arm in the first slot, and the second notch is configured to lock the support arm in the second slot.

Clause 13. The frame enhancer of clause 12 or 13, wherein the first notch extends from the first extension, and the second notch extends from the third extension.

Clause 14. The frame enhancer of any of clauses 11-13, wherein the first extension and the third extension extend a distance longer than the second extension.

Clause 15. The frame enhancer of any of clauses 11-14, wherein the first extension comprises a first leg and a second leg defining the first channel therebetween, wherein the second extension comprises a first leg and a second leg defining a second channel therebetween, and wherein the third extension comprises a first leg and a second leg defining the third channel therebetween.

Clause 16. The frame enhancer of any of clauses 11-15, wherein the second legs of the first extension, the second extension, and the third extension extend beyond their respective first legs, and wherein the first and second legs of the first extension, the second extension, and the third extension support the flange.

Clause 17. A frame enhancer assembly for supporting a bracket, the frame enhancer comprising: a tilt arm; a bracket extending from and supported by the tilt arm; and a frame enhancer comprising: a body having a first extension, a second extension, and a third extension, wherein the first extension and the second extension define a first slot configured to receive a portion of the tilt arm therein, wherein the second extension and the third extension define a second slot configured to receive a portion of the tilt arm therein, wherein the first extension defines a first channel configured to receive a portion of the bracket therein, wherein the second extension defines a second channel, wherein the third extension defines a third channel configured to receive a portion of the bracket therein, wherein the frame enhancer is configured to be mounted to the tilt arm and the bracket, and wherein at least a portion of the first extension and the third extension are configured to support the bracket.

Clause 18. The assembly of clause 17, wherein the frame enhancer further comprises a first notch extending into the first slot and a second notch extending into the second slot, and wherein the first notch is configured to lock the portion of the tilt arm in the first slot, and the second notch is configured to lock the portion of the tilt arm in the second slot.

Clause 19. The assembly of clause 17 or 18, wherein the first extension comprises a first leg and a second leg defining the first channel therebetween, and wherein the third extension comprises a first leg and a second leg defining the third channel therebetween.

Clause 20. The assembly of any of clauses 17-19, wherein the frame enhancer is configured to be slidably mounted to the tilt arm and the bracket.

DETAILED DESCRIPTION OF THE INVENTIONS

Figure 1:
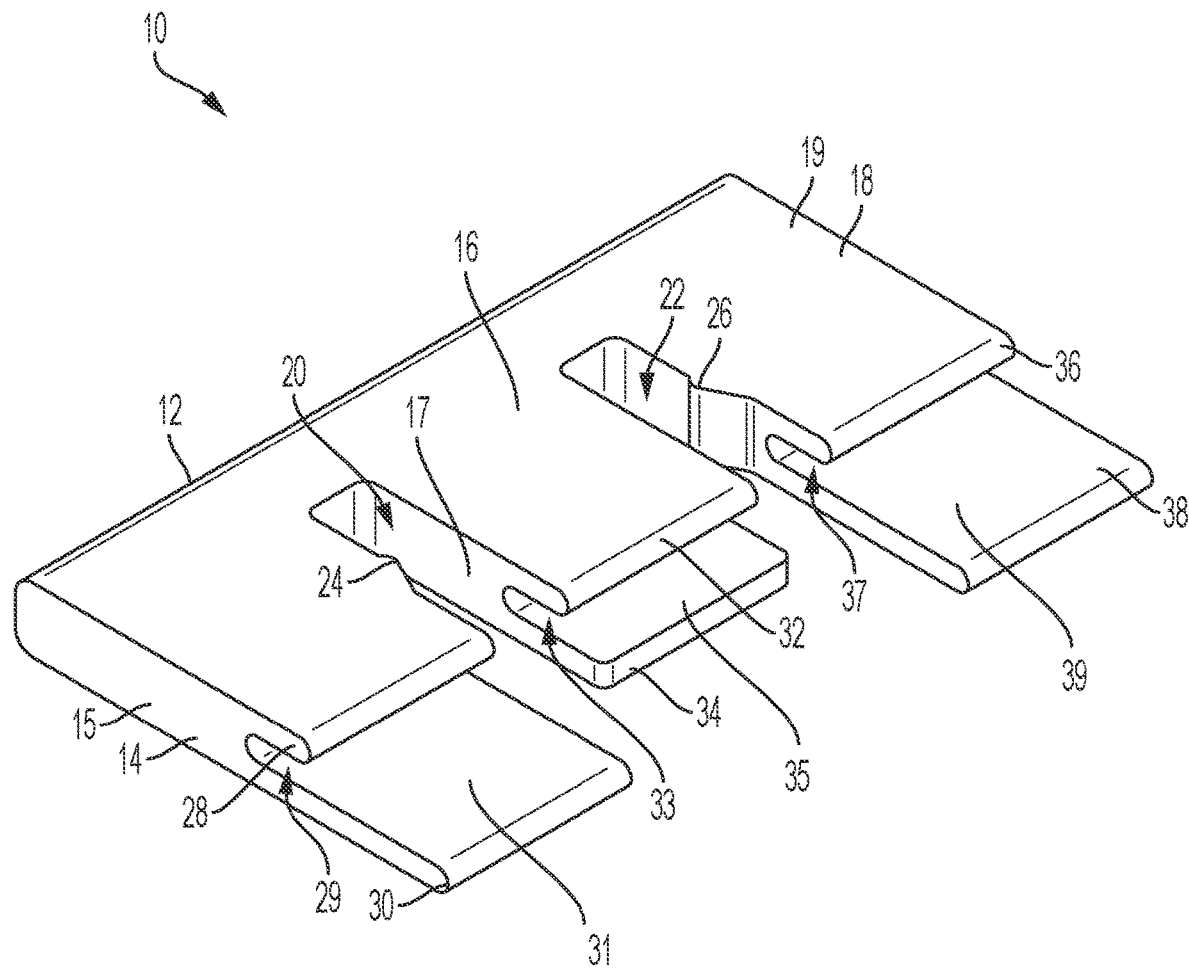
FIG. 1 is a perspective view of a frame enhancer according to one non-limiting embodiment of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

For purposes of the description hereinafter, the terms "upper", "lower", "right", "left". "vertical", "horizontal", "top", "bottom", "lateral", "longitudinal", and derivatives thereof shall relate to the disclosure as it is oriented in the figures. However, it is to be understood that the disclosure may assume alternative variations and step sequences, except where expressly specified to the contrary. It is also to be understood that the specific devices and processes illustrated in the attached drawings and described in the following specification are simply exemplary aspects of the disclosure. Hence, specific dimensions and other physical characteristics related to the aspects disclosed herein are not to be considered as limiting.

The terms "first", "second", and the like are not intended to refer to any particular order or chronology, but refer to different conditions, properties, or elements.

The term "at least" is synonymous with "greater than or equal to".

The term "includes" is synonymous with "comprises".

The present invention may be used with solar panel array support structures which connect to a flange of the solar panel frame. This connection may be achieved by a clamping device or a fastener. The solar panel frames are not universal across solar panel manufacturers and frame designs, shapes, dimensions, sizes, thicknesses, lengths, widths, and flange thicknesses vary across solar panel manufacturers. Solar panel array racking systems and support structures that utilize a solar panel frame flange may be used to support solar panels with relatively thin flanges and these systems may also be used in regions of higher loads from snow and wind. These systems especially supporting solar panels with thinner flanges and especially in regions with higher downward and uplift loads can apply a bending or flexing force upon the flange.

The present disclosure is directed, in general, to a frame enhancer 10 designed to be mounted to a tilt arm 50 and support flange 56 in order to support the flange 56. Certain aspects of the frame enhancer 10 are shown in FIGS. 1-7.

Figure 2:
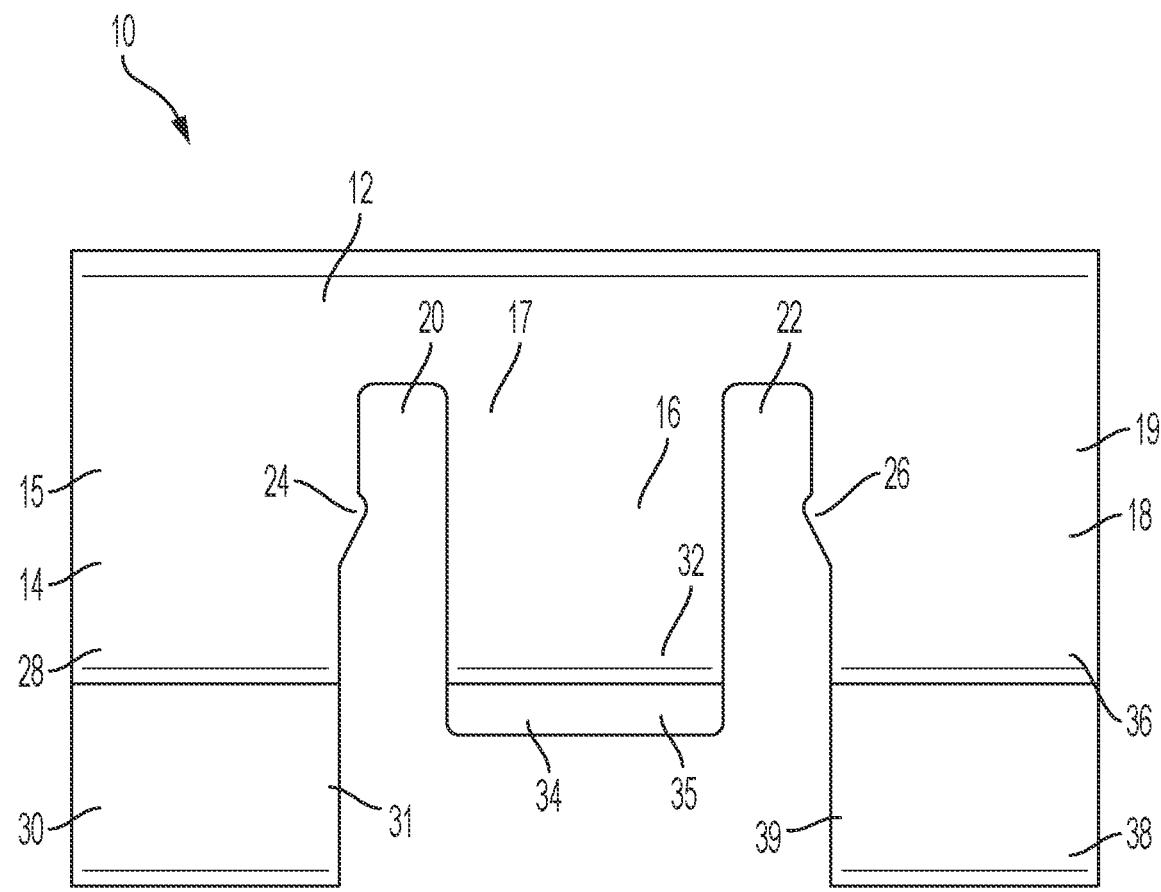
FIG. 2 is a top view of the frame enhancer of FIG. 1.
Figure 3:
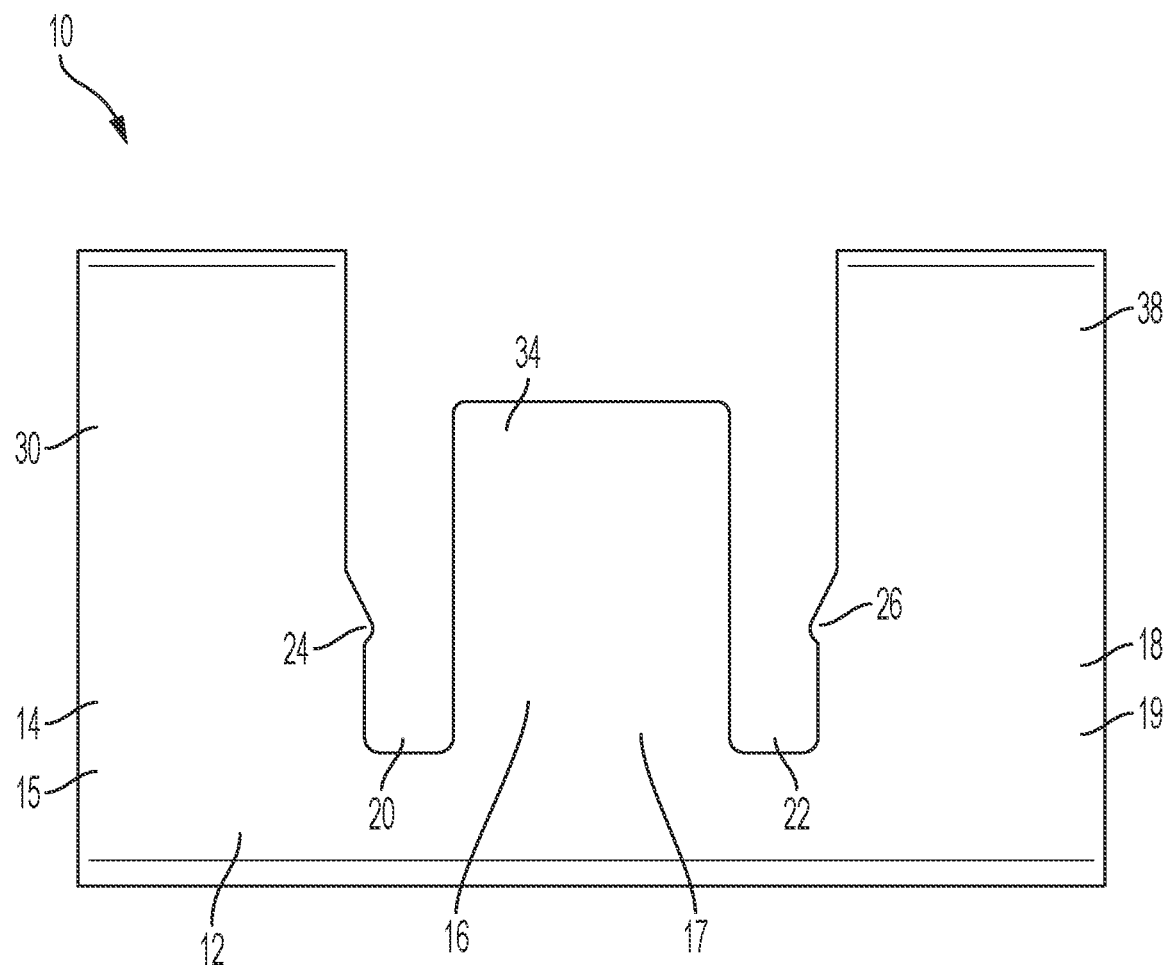
FIG. 3 is a bottom view of the frame enhancer of FIG. 1.
Figure 4:
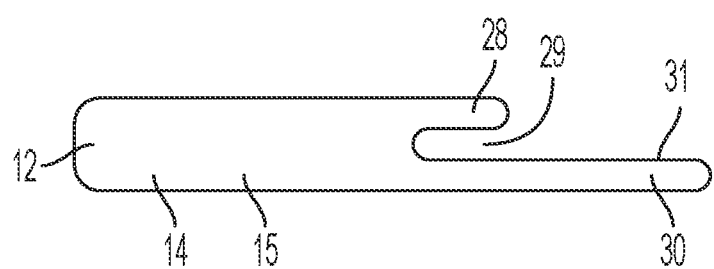
FIG. 4 is a side view of the frame enhancer of FIG. 1.

With reference to FIGS. 1-4, the frame enhancer 10 includes a base 12 generally extending along the entire length of the frame enhancer 10. Extending from the base 12 proximate one end is a first extension 14, a second extension 16, and a third extension 18. The first extension 14 extends from the base 12 proximate one end, the second extension 16 extends from the base 12 at approximately at a middle portion thereof, and the third extension 18 extends from the base 12 proximate an end opposing that of the first extension 14. Each of the three extensions 14, 16, 18 extend in the same direction away from the base 12 and are spaced apart from one another so that the frame enhancer 10 generally takes an E-shape, as can be seen in FIGS. 1-3. To further define the E-shape, the first extension 14 and the second extension 16 define a first slot 20 therebetween, and the second extension 16 and the third extension 18 define a second slot 22 therebetween. As will be described below, the first slot 20 and the second slot 22 contain respective notches 24, 26, in order to receive and lock portions of a support arm therein.

The first extension 14 includes a body portion 15 that extends directly from the base 12. The body portion 15 includes the notch 24, which extends from the body portion 15 and into the first slot 20. As the body portion 15 extends in a direction away from the base 12, it divides into two legs: a first leg 28 and a second leg 30. Both legs 28, 30 extend in the same direction away from the base 12 and the body portion 15, and define a channel 29 therebetween. Both legs 28, 30 also terminate at rounded edge surfaces, although other edge shapes or arrangements may be used. As will be described below, the channel 29 is arranged to receive and support a flange or another element of a panel therein for support. As shown, the second leg 30 extends beyond the first leg 28. This allows for a top surface 31 of the second leg 30 to also support the flange 56 when the frame enhancer 10 is engaged and in use. It is to be understood that the first 28 and second 30 legs of the first extension 14 may extend any distance away from the base 12 and any distance relative to each other so long as the frame enhancer 10 provides support to a flange 56. In some instances, it may be advantageous to have the first leg 28 and the second leg 30 extend the same distance away from the body 12, to ensure the flange 56 is held within the channel 29. In some embodiments, the top surface 31 of the second leg 30 or other portions of the first and second legs 28, 30 may have gripping or connection features that better facilitate the connection between the frame enhancer 10 and the flange 56.

The second extension 16 includes a body portion 17 that extends directly away from the base 12. Although the notches 24, 26 are shown as extending into, respectively, the first and second slots 20, 22, the second extension 16 may have the notches 24, 26 extending into the first and second slots 20, 22 on opposing sides of the body portion 17. As the body portion 17 extends away from the base 12, it divides into two legs: a first leg 32 and a second leg 34. Both legs 32, 34 extend in the same direction away from the base 12 and the body portion 17. The legs 32, 34 define a channel 33 therebetween. Both legs 32, 34 also terminate at rounded edge surfaces, although other edge shapes or arrangements may be used. As will be described below, the channel 33 is arranged to receive and support a flange 56 or another element of a panel therein for support. As shown, the second leg 34 extends beyond the first leg 32. This allows for a top surface 35 of the second leg 34 to also support the flange 56 when the frame enhancer 10 is engaged and in use. As shown, the second leg 34 does not extend beyond the first leg 32 the same distance the second leg 30 of the first extension 14 extends beyond the first leg 28. However, it is contemplated that the second leg 34 of the second extension 16 may extend just as far as the second leg 30 of the first extension 14. The second leg 34 may also extend away from the body 17 the same distance as the first leg 32 and include various gripping features similar to what was described above in connection with the first extension 14.

The third extension 18 includes a body portion 19 that extends directly from the base 12. The body portion 19 includes the notch 26, which extends from the body portion 19 and into the second slot 22. As the body portion 19 extends in a direction away from the base 12, it divides into two legs: a first leg 36 and a second leg 38. Both legs 36, 38 extend in the same direction away from the base 12 and the body portion 19, and define a channel 37 therebetween. Both legs 36, 38 also terminate at rounded edge surfaces, although other edge shapes or arrangements may be used. The channel 37, like channels 29, 33 described above, is arranged to receive and support a flange 56 or another element of a panel therein for support. As shown, the second leg 38 extends beyond the first leg 36. This allows for a top surface 39 of the second leg 38 to also support the flange 56 when the frame enhancer 10 is engaged and in use. It is to be understood that the first and second legs 36, 38 of the third extension 18 may extend any distance away from the base 12 and any distance relative to each other so long as the frame enhancer 10 provides support to a flange 56. In some instances, it may be advantageous to have the first leg 36 and the second leg 38 extend the same distance away from the body 12, to ensure the flange 56 is held within the channel 37. In some embodiments, the top surface 39 of the second leg 38 or other portions of the first and second legs 36, 38 may have gripping or connection features that better facilitate the connection between the frame enhancer 10 and the flange 56.

Figure 5:
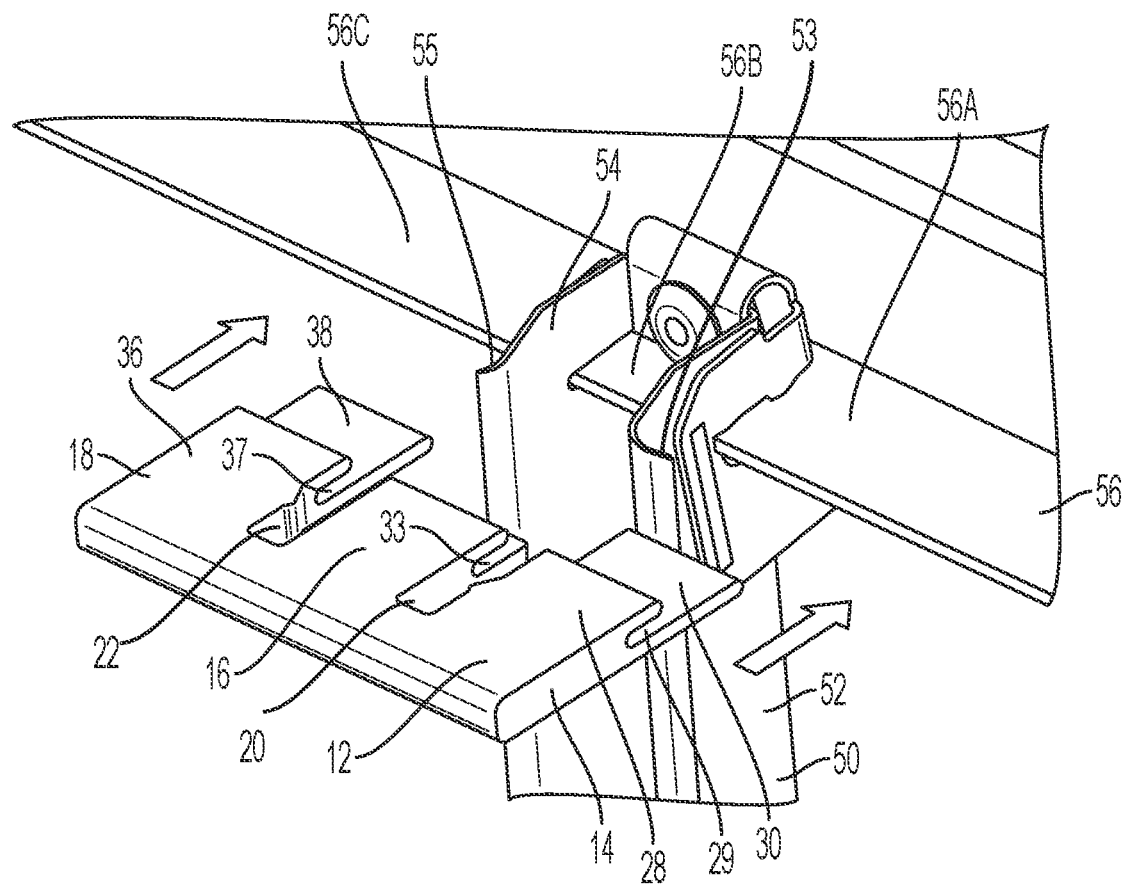
FIG. 5 is a perspective view of the frame enhancer of FIG. 1 shown being applied to a support arm and flange.
Figure 6A:
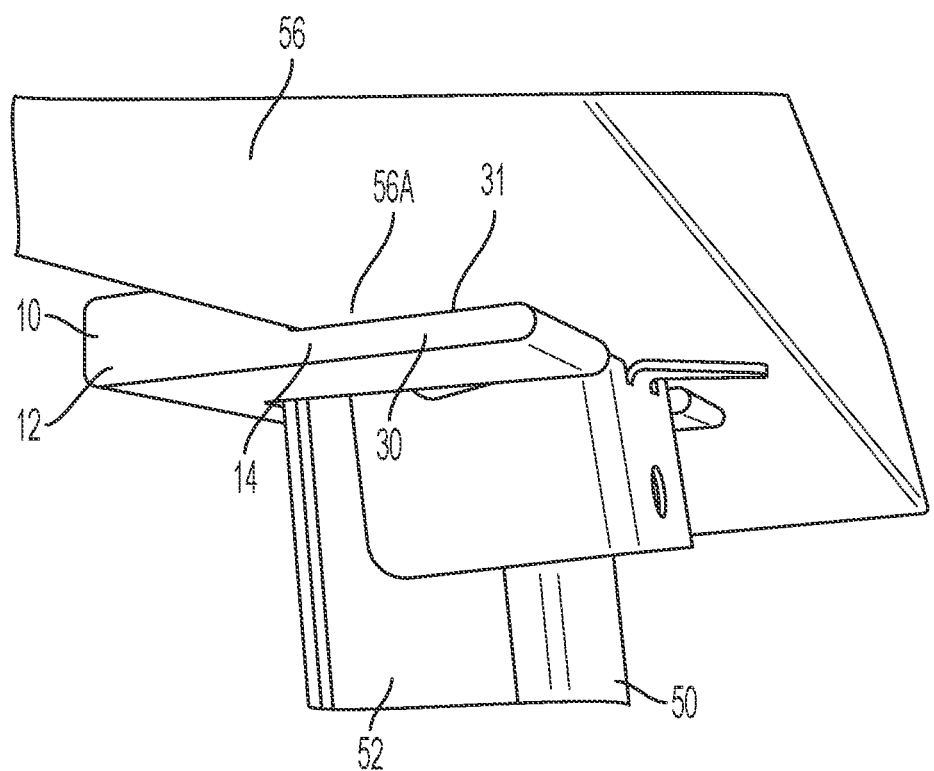
FIG. 6A a bottom perspective view of the frame enhancer of FIG. 1 mounted to the support arm and flange of FIG. 5.
Figure 6B:
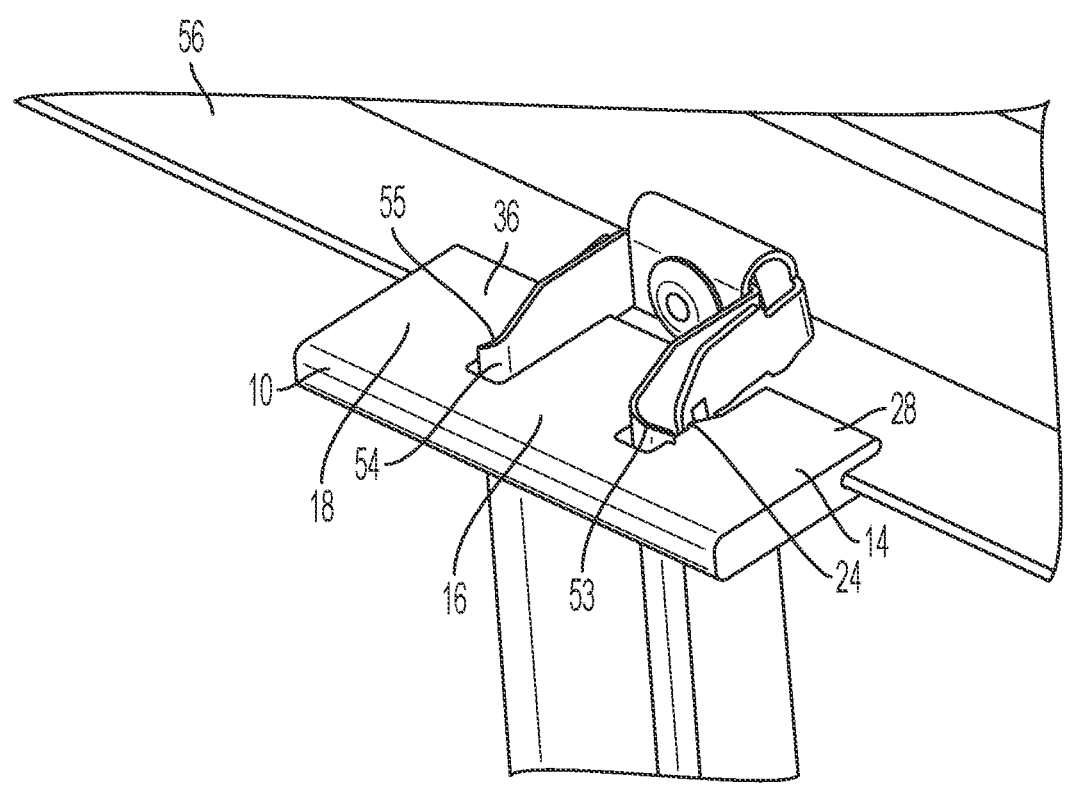
FIG. 6B is a top perspective view of the frame enhancer of FIG. 1 mounted to the support arm and flange of FIG. 5.
Figure 7:
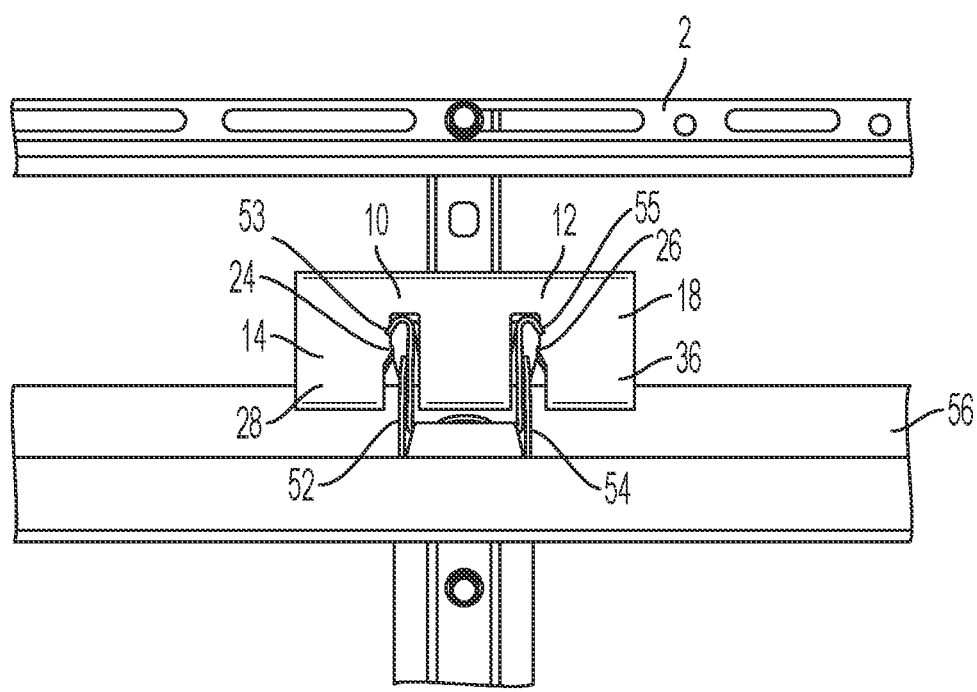
FIG. 7 is a top view of the frame enhancer of FIG. 1 mounted to a rail the support arm and flange of FIG. 5.

With reference to FIGS. 5-7, the application of the frame enhancer 10 in an environment is shown. The frame enhancer 10 is aligned with a support arm 50. The support arm 50 may be a tilt arm in a solar panel array and be used to support a solar panel or other elements that in turn support a solar panel. The support arm 50 is connected to a flange or bracket 56 (referred to as a flange throughout the rest of the application) that is also aligned with the frame enhancer 10. By applying the frame enhancer 10 to the support arm 50 and flange 56, the load supported by the flange 56 can be increased, allowing the flange 56 and those elements connected to the flange 56, such as a solar panel, to handle a greater load, such as a heavy snow fall and high winds.

As shown in FIG. 5, the slots 20, 22 defined between the extensions 14, 16, 18 are aligned with two corresponding arms 52, 54 of the support arm 50. The frame enhancer 10 is then pushed against the support arm 50 in the direction of the arrows. Arm 52 terminates with a hooked end 53, and arm 54 terminates with a hooked end 55. The notches 24, 26 are arranged within their respective slots 20, 22, so as to engage with the hooked ends 53, 55. This engagement locks the arms 52, 54 of the support arm 50 within the slots 20, 22, and effectively mounts the frame enhancer 10 to the support arm 50. During the application of the frame enhancer 10, an audible click may be heard when the hooked ends 53, 55 are engaged with the notches 24, 26. This application is the slide-and-click method. When the frame enhancer 10 is mounted to the support arm 50, it is free to slide up and down a length of the support arm 50. It is also contemplated that the notches 24, 26 and/or the hooked ends 53, 55 have certain frictional characteristics that prevent the frame enhancer 10 from sliding along the length of the support arm 50. In this arrangement, once the arms 50, 52 are received within the slots 20, 22, and the hooked ends 53, 55 are engaged with the notches 24, 26, the frame enhancer 10 is locked into place relative to the support arm 50 and flange 56. To prevent relative movement, the notches 24, 26 may also have a slit or another complementary feature that receives part of the hooked ends 53, 55 therein in order to securely lock the frame enhancer 10 relative to the support arm 50 and flange 56.

In order to be fully mounted, the frame enhancer 10 is aligned with the flange 56 so that the channels 29, 33, 37, defined within the respective extensions 14, 16, 18, can receive portions of the flange 56 therein. Channel 29 receives a portion of the flange 56A therein. Channel 33 receives a portion of the flange 56B therein. Flange 56B is separated from the other flange portions by the support arms 52, 54. Channel 37 receives a portion of the flange 56C therein. When the channels 29, 33, 37 are aligned with their respective flange portions 56A, 56B, 56C, then the frame enhancer 10 can be pushed farther in the direction of the arrows shown in FIG. 5 so that the flange portions 56A, 56B, 56C can be received within the channels 29, 33, 37. In this arrangement, the respective top surfaces 31, 35, 39 can be arranged against the bottom of the flange 56 and provide support thereto. The arrangement of the frame enhancer 10 about the support arm 50 and flange 56 provides support to the flange 56 and any elements provided thereon.

When downward loads are present the solar panel is forced downward against the connection to the support arm 50 resulting in the outer frame portions 56A and 56C bending downward while the interior frame portion 56B is forced upward. Under this condition the first extension 14 and the third extension 18 provide an upward support on frame portions 56A, 56C. In particular, the second legs 30, 38 of the first extension 14 and third extensions act upwardly on frame portions 56A, 56C. The top surfaces 31, 39 of the respective second legs 30, 38 contact the bottom surfaces of the outer frame portions 56A, 56C and resist the downward bending of the module frame while the first leg 32 of the second extension 16 resists the upward bending of the central module frame portion 56B. The downward forces can be created by a build-up of snow, debris, or other items on top of the solar panel.

Similarly during high wind conditions the solar panels experience uplift forces which may tend to bend the outer frame portions 56A and 56C upward and the central frame portions 56B downward. In this case, the first leg 28 of the first extension 14 and the first leg 36 of the third extension 18 contact the top surfaces of the outer frame portions 56A and 56C to resist the upward bending of these outer portions 56A, 56C, while the top surface 35 of the second leg 34 of the second extension 16 resists the downward movement of the central frame portion 56B.

In this way the panel frame portions being located within the channels 29, 33, and 37 limits the bending movement of the panel frame portions 56A, 56B, and 56C upward or downward to the space within the channels 29, 33, and 37, and thereby provides support to the panel frame 56 and enhances the connection between the support arm 50 and the solar panel frame 56.

Based on this support, a preferred embodiment of the present disclosure includes an E-shaped frame enhancer 10, with each of the three extensions 14, 16, 18 acting as one of the legs of the E and the base 12 acting as the spine of the E. The E-shaped embodiment is a result of the arrangement between the flange 56 and both arms 52, 54 of the support arm 50. Thus, a spaces formed within this arrangement is susceptible to flexing and bending, which is benefited by additional support. This disclosure also contemplates a frame enhancer 10 that supports a flange 56 that is clamped with a single sided support arm or other clamping device on the flange 56. This would result in a different shaped frame enhancer 10 than the E-shaped frame enhancer 10 described herein. Such a frame enhancer 10 may take a U-shape that can support the flange 56 on both sides of the clamping device.

By contacting the arms 52, 54, the frame enhancer 10 is electrically bonded to the support arm 50. To remove the arms 52, 54 from their slots 20, 22, the arms 52, 54 are squeezed or otherwise deflected towards each other, releasing their hooked ends 53, 55 from the notches 24, 26 and allowing the frame enhancer 10 to slide away from the support arm 50 in a direction opposite to the arrows shown in FIG. 5.

While various aspects of the frame enhancer 10 were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims, and all changes to the invention that fall within the meaning and the range of equivalency of the claims are to be embraced within their scope.

The invention claimed is:

1. A frame enhancer comprising:
   a base;
   a first extension extending from the base, the first extension comprising a first notch;
   a second extension extending from the base; and
   a third extension extending from the base, the third extension comprising a second notch,
   wherein the first extension and the second extension define a first slot,
   wherein the second extension and the third extension define a second slot,
   wherein the first slot is configured to receive a first side of a support arm therein, and the second slot is configured to receive a second side of the support arm therein,
   wherein the first notch is configured to lock the first side of the support arm within the first slot, and the second notch is configured to lock the second side of the support arm within the second slot, and
   wherein at least a portion of the first extension, the second extension, and the third extension are configured to support a flange connected to the support arm.

2. The frame enhancer of claim 1, wherein the first extension comprises a first leg and a second leg defining a first channel therebetween,
   wherein the third extension comprises a first leg and a second leg defining a second channel therebetween, and
   wherein the first channel and the second channel are configured to receive the flange therein.

3. The frame enhancer of claim 2, wherein the second leg of the first extension extends farther than the first leg of the first extension, and
   wherein the second leg of the third extension extends farther than the first leg of the third extension.

4. The frame enhancer of claim 3, wherein the second leg of the first extension and the second leg of the third extension support the flange.

5. The frame enhancer of claim 2, wherein, the first slot is configured to receive the first side of the support arm therein, and the second slot is configured to receive the second side of the support arm therein thereby slidably mounting the frame enhancer to the support arm.

6. The frame enhancer of claim 3, wherein the first notch extends from a portion of the first extension adjacent to the first channel, and the second notch extends from a portion of the third extension adjacent to the second channel.

7. The frame enhancer of claim 1, wherein the second extension comprises a first leg and a second leg defining a third channel therebetween, and
   wherein the third channel is configured to receive a portion of the flange therein.

8. The frame enhancer of claim 7, wherein the portion of the flange received within the third channel is located between the first and second sides of the support arm.

9. The frame enhancer of claim 1, wherein the frame enhancer is electrically bonded to the support arm.

10. The frame enhancer of claim 1, wherein the first extension and the third extension extend from the base a first length, and the second extension extends from the base a second length, and
    wherein the first length is longer than the second length.

11. A frame enhancer comprising:
    a body comprising:
      a first extension;
      a second extension; and
      a third extension,
    wherein the first extension and the second extension define a first slot configured to receive a portion of a support arm therein,
    wherein the second extension and the third extension define a second slot configured to receive a portion of the support arm therein,
    wherein the first extension defines a first channel configured to receive a portion of a flange therein,
    wherein the second extension defines a second channel,
    wherein the third extension defines a third channel configured to receive a portion of the flange therein,
    wherein the frame enhancer is configured to be mounted to the support arm and the flange, and
    wherein at least a portion of the first extension, the second extension, and the third extension are configured to support the flange.

12. The frame enhancer of claim 11, wherein the frame enhancer further comprises a first notch extending into the first slot and a second notch extending into the second slot, and
    wherein the first notch is configured to lock the support arm in the first slot, and the second notch is configured to lock the support arm in the second slot.

13. The frame enhancer of claim 12, wherein the first notch extends from the first extension, and the second notch extends from the third extension.

14. The frame enhancer of claim 11, wherein the first extension and the third extension extend a distance longer than the second extension.

15. The frame enhancer of claim 14, wherein the first extension comprises a first leg and a second leg defining the first channel therebetween,
wherein the second extension comprises a first leg and a second leg defining the second channel therebetween, and
wherein the third extension comprises a first leg and a second leg defining the third channel therebetween.

16. The frame enhancer of claim 15, wherein the second legs of the first extension, second extension, and third extension extend beyond their respective first legs, and
wherein the first and second legs of the first extension, second extension, and third extension support the flange.

17. An assembly for enhancing a frame to support a bracket, the assembly comprising:
a tilt arm;
a bracket extending from and supported by the tilt arm; and
a frame enhancer comprising:
a body having a first extension, a second extension, and a third extension,
wherein the first extension and the second extension define a first slot configured to receive a portion of the tilt arm therein,
wherein the second extension and the third extension define a second slot configured to receive a portion of the tilt arm therein,
wherein the first extension defines a first channel configured to receive a portion of the bracket therein,
wherein the second extension defines a second channel,
wherein the third extension defines a third channel configured to receive a portion of the bracket therein,
wherein the frame enhancer is configured to be mounted to the tilt arm and the bracket, and
wherein at least a portion of the first extension and the third extension are configured to support the bracket.

18. The assembly of claim 17, wherein the frame enhancer further comprises a first notch extending into the first slot and a second notch extending into the second slot, and
wherein the first notch is configured to lock the portion of the tilt arm in the first slot, and the second notch is configured to lock the portion of the tilt arm in the second slot.

19. The assembly of claim 17, wherein the first extension comprises a first leg and a second leg defining the first channel therebetween, and
wherein the third extension comprises a first leg and a second leg defining the third channel therebetween.

20. The assembly of claim 17, wherein the frame enhancer is configured to be slidably mounted to the tilt arm and the bracket.

* * * * *